(12) United States Patent
Hu

(10) Patent No.: US 12,302,293 B2
(45) Date of Patent: May 13, 2025

(54) SYSTEMS AND METHOD OF DESCRIBING SLOT INFORMATION

(71) Applicant: Facebook Technologies, LLC, Menlo Park, CA (US)

(72) Inventor: Chunyu Hu, Saratoga, CA (US)

(73) Assignee: META PLATFORMS TECHNOLOGIES, LLC

( * ) Notice: Subject to any disclaimer, the term of this patent is extended or adjusted under 35 U.S.C. 154(b) by 721 days.

(21) Appl. No.: 17/397,392

(22) Filed: Aug. 9, 2021

(65) Prior Publication Data

US 2022/0061047 A1 Feb. 24, 2022

Related U.S. Application Data

(60) Provisional application No. 63/069,615, filed on Aug. 24, 2020.

(51) Int. Cl.
| | |
|---|---|
| *H04W 72/0446* | (2023.01) |
| *H04W 72/1263* | (2023.01) |
| *H04W 72/21* | (2023.01) |
| *H04W 72/566* | (2023.01) |
| *H04W 84/12* | (2009.01) |

(52) U.S. Cl.
CPC ... *H04W 72/0446* (2013.01); *H04W 72/1263* (2013.01); *H04W 72/21* (2023.01); *H04W 72/569* (2023.01); *H04W 84/12* (2013.01)

(58) Field of Classification Search
CPC ......... H04W 72/0446; H04W 72/1263; H04W 72/21; H04W 72/569; H04W 84/12
See application file for complete search history.

(56) References Cited

U.S. PATENT DOCUMENTS

| | | | | |
|---|---|---|---|---|
| 2013/0065525 | A1* | 3/2013 | Kiukkonen | H04W 52/36 455/41.2 |
| 2015/0341130 | A1 | 11/2015 | Zhou et al. | |
| 2020/0059979 | A1* | 2/2020 | Abouelseoud | H04W 48/12 |
| 2022/0167397 | A1* | 5/2022 | Thangarasa | H04W 74/08 |
| 2023/0171792 | A1* | 6/2023 | Sun | H04W 72/02 370/329 |

FOREIGN PATENT DOCUMENTS

| | | |
|---|---|---|
| CN | 101360339 B | 4/2012 |
| WO | 2015069987 A1 | 5/2015 |

OTHER PUBLICATIONS

International Search Report and Written Opinion for International Application No. PCT/US2021/046390, mailed Dec. 7, 2021, 9 pages.
Office Action mailed Dec. 10, 2024 for Taiwan Application No. 110130654, filed Aug. 19, 2021, 10 pages.

* cited by examiner

*Primary Examiner* — Brian P Cox
(74) *Attorney, Agent, or Firm* — FOLEY & LARDNER LLP

(57) ABSTRACT

Disclosed herein are systems and methods related to describing slot information. In one aspect, a first wireless communication device determines a bitmap having a value for each of a plurality of slots for wireless traffic. The bitmap may indicate a status or type of a corresponding slot. The first wireless communication device may send, using a wireless local area network (WLAN) based protocol, to a second wireless communication device, a message comprising the bitmap. The message may further comprise a duration of each of the plurality of slots, a period of the plurality of slots, and a persistency of the plurality of slots.

18 Claims, 5 Drawing Sheets

| Slot Duration 502 | Bitmap Length 504 | Information Bitmap Present 506 | Period 508 | Persistence 510 | Status Bitmap 512 | Information Bitmap 514 |

FIG. 5

SYSTEMS AND METHOD OF DESCRIBING SLOT INFORMATION

CROSS-REFERENCE TO RELATED APPLICATION

This application claims priority to and the benefit of U.S. Provisional Application No. 63/069,615, filed Aug. 24, 2020, entitled "SLOT INFORMATION DESCRIPTION", which is incorporated herein by reference in its entirety for all purposes.

FIELD OF DISCLOSURE

The present disclosure is generally related to communications, including but not limited systems and methods of describing slot information.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Disclosed herein are systems and methods related to describing slot information. Resources and/or time slots (sometimes referred to herein as "slots") can be adaptively allocated for communication of traffic based on utilization and priorities of channel access. The communication of traffic associated with latency sensitive applications may be prioritized over regular traffic. The prioritization of latency sensitive traffic (or traffic streams) can improve the quality of service of latency sensitive applications. Access to certain prioritized slots may be negotiated between various devices.

Some embodiments are related to a method of determining, by a first wireless communication device, a bitmap having a value for each of a plurality of slots for wireless traffic, to indicate a status or type of a corresponding slot; and sending, by the first wireless communication device to a second wireless communication device using a wireless local area network (WLAN) based protocol, a message comprising the bitmap, wherein the message further comprises a duration of each of the plurality of slots, a period of the plurality of slots, and a persistency of the plurality of slots.

In some embodiments, the status or type of the corresponding slot indicates that the corresponding slot is occupied, is being requested by the first wireless communication device, or is being assigned by the first wireless communication device. In some embodiments, the value for each of the plurality of slots is carried in 1 bit. In some embodiments, the status or type of the corresponding slot indicates that the corresponding slot is at least one of: full or not accepting wireless traffic from a new device, for trigger-only frame sequence, occupied by overlap basic service set (OBSS) traffic, or assigned to peer-to-peer (P2P) traffic. In some embodiments, the value for each of the plurality of slots is carried in 4 bits.

In some embodiments, when the period has a positive integer value, the positive integer value indicates a number of slots as the period, and when the period has a value of 0, the plurality of slots is non-periodic. In some embodiments, the persistency indicates a duration over which information in the message is valid. In some embodiments, the message further comprises at least one of: an indication of a length of the bitmap, or an indication of whether the bitmap is present in the message. In some embodiments, the message comprises a beacon frame, a probe response, a reporting frame, a frame for advertising slot configuration, a slot request frame, a slot response frame, a frame for slot termination, or a frame to conduct inter basic service set (inter-BSS) access coordination. In some embodiments, the message is a slot request frame, the message further comprising at least one of: a request type, a flexible slot offset indicator, an indicator of slot exclusivity or sharing, a minimum number of slots requested, a minimum resource unit (RU) to be used, or a minimum number of spatial streams (NSS) to be used. In some embodiments, monitoring, by the first wireless communication device, a utilization of the plurality of slots; and determining, by the first wireless communication device, the bitmap to update an assignment of at least one of the plurality of slots.

Other embodiments are related to at least one processor configured to determine a bitmap having a value for each of a plurality of slots for wireless traffic, and/or to indicate a status or type of a corresponding slot. A transceiver may be configured to send, to a second wireless communication device using a wireless local area network (WLAN) based protocol, a message comprising the bitmap. The message can comprise a duration of each of the plurality of slots, a period of the plurality of slots, and a persistency of the plurality of slots.

In some embodiments, the status or type of the corresponding slot indicates that the corresponding slot is occupied, is being requested by the first wireless communication device, or is being assigned by the first wireless communication device. In some embodiments, the value for each of the plurality of slots is carried in 1 bit. In some embodiments, the status or type of the corresponding slot indicates that the corresponding slot is at least one of: full or not accepting wireless traffic from a new device, for trigger-only frame sequence, occupied by overlap basic service set (OBSS) traffic, or assigned to peer-to-peer (P2P) traffic. In some embodiments, the value for each of the plurality of slots is carried in 4 bits.

In some embodiments, when the period has a positive integer value, the positive integer value indicates a number of slots as the period, and when the period has a value of 0, the plurality of slots is non-periodic. In some embodiments, the persistency indicates a duration over which information in the message is valid. In some embodiments, the message further comprises at least one of: an indication of a length of the bitmap, or an indication of whether the bitmap is present in the message. In some embodiments, the message comprises a beacon frame, a probe response, a reporting frame, a frame for advertising slot configuration, a slot request frame, a slot response frame, a frame for slot termination, or a frame to conduct inter basic service set (inter-BSS) access coordination.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 5 is an example format of a slot schedule descriptor, according to an example implementation of the present disclosure.

DETAILED DESCRIPTION

Figure 1:
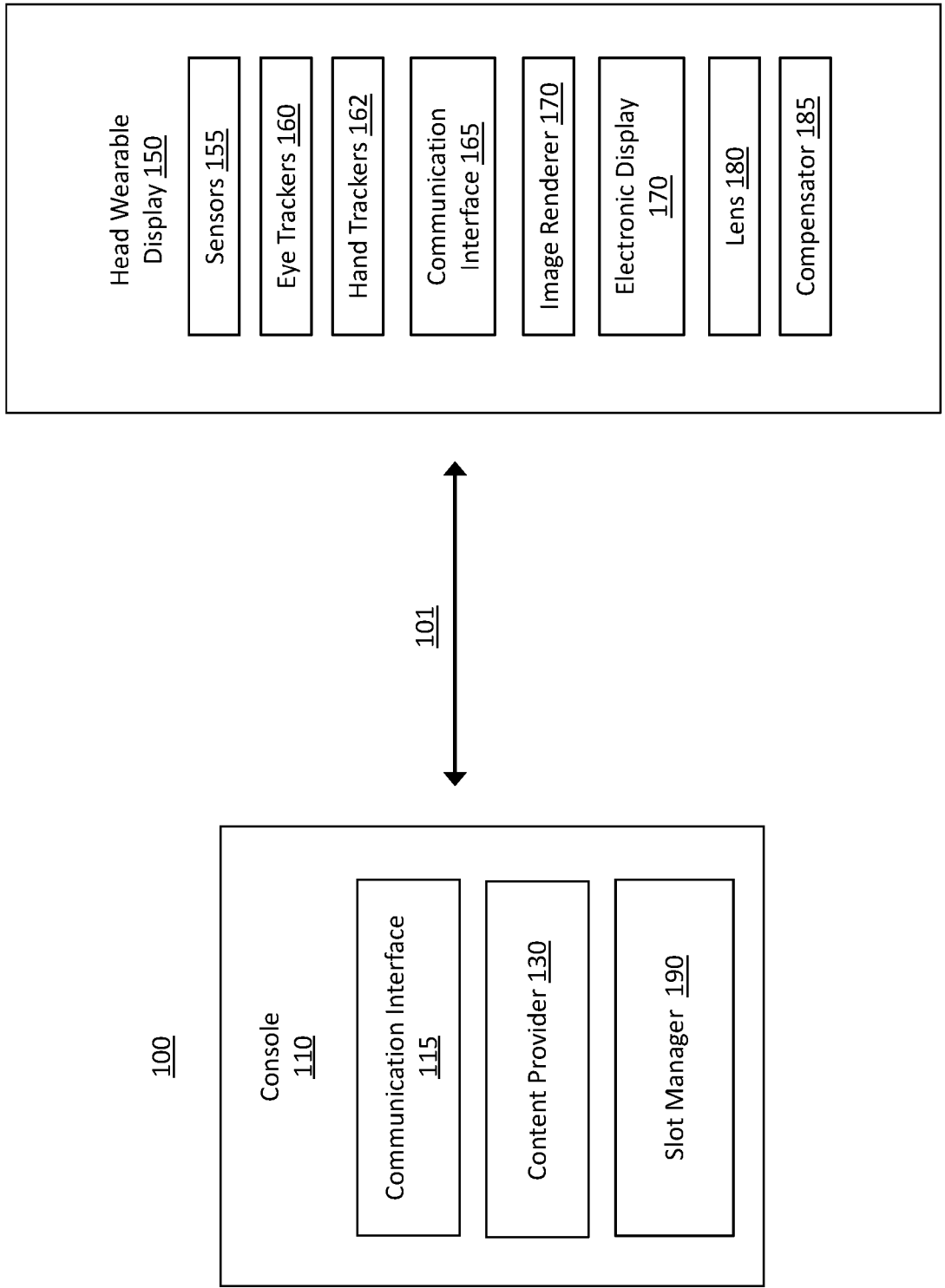
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable, in part, based on its periodicity nature (e.g., periodic bursts of traffic) and low latency requirement, in some embodiments. For instance, video display traffic may be driven by a refresh rate of 60 Hz, 72 Hz, 90 Hz, or 120 Hz. An application and/or device may have combinations of traffic types (e.g., latency sensitive traffic and non-latency sensitive traffic). Further, each stream of traffic for the application and/or device may be more or less spontaneous and/or periodic as compared to other streams of traffic for the application and/or device. Accordingly, traffic may vary according to applications and/or channel rate dynamics.

In some implementations, devices may communicate using allocated channel transmission bandwidth such that only admitted (e.g., registered or assigned) devices have access to the channel.

In some implementations, devices may provide different quality of services over different links. For example, a device (such as an access point (AP)) may direct a station (STA) carrying latency sensitive traffic to operate over one link or a subset of links. The quality of service of applications that depend on latency sensitive traffic may be improved using links dedicated to latency sensitive traffic. A device (e.g., AP, soft AP, console) may configure latency sensitive time slots such that the latency sensitive slots are prioritized over regular time slots. A device (e.g., AP, soft AP) may control (or manage, schedule) the traffic streams and/or station (STAs) access to allocated links. For example, only admitted STAs may access slots on the allocated links. The devices (e.g., AP and/or STA) may agree on a distribution of traffic streams for prioritized slots of a link.

In some implementations, a device may increase the throughput of a network by aggregating links in the network. Devices configured to support multi-link operation (MLO) may be capable of supporting flexible traffic steering and load balancing. For example, a device (e.g., an AP) may assign (or schedule) traffic to different links based on access categories (ACs), traffic identifiers (TIDs), source/destination addresses, particular devices, attributes associated with the traffic (e.g., latency sensitive traffic), and/or the direction of traffic (e.g., uplink (UL) traffic, downlink (DL) traffic). Additionally or alternatively, a device may increase a channel's access opportunities by enabling asynchronous/synchronous transmissions.

In some applications, latency sensitive traffic that is not prioritized may degrade a user experience. For example, in an AR context, latency between a movement of a user wearing an AR device and an image corresponding to the user movement and displayed to the user using the AR device may cause judder, resulting in motion sickness.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the predistorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

The slot manager 190 of the console 150 may divide links (including latency sensitive links (LSL)) into periodic intervals. The intervals may include a fixed and/or configurable number of slots.

In an example, the slot manager 190 may determine a period based on $2^x$ time units, where x is a positive integer. In the AR/VR context for instance, the slot manager 190 may choose a duration of a period to be 1024 microseconds for the duration of a slot and set 16 slots as intervals corresponding to a 60 Hz frame per second display rate. Additionally or alternatively, the slot manager 190 may select a duration of each of the slots in the period to be a positive fraction and/or integer time unit (TU) (e.g., ½, 1, 2, 3 . . . TUs).

The slot manager 190 may assign membership to (e.g., manage, or allocate) the slots based on a handshake (or some other type of negotiation) between devices (e.g., HWD 150). For example, the slot manager 190 may accept a requested assignment of slots and can assign one or more contiguous and/or non-contiguous slots to the requesting device.

The slot manager 190 may construct a bitmap to indicate the slot's busy/idle status and advertise this bitmap with necessary associated information in frames such as (but not limited to) Beacons, Probe Response, slot information announcement/response frames. The bitmap may be shared to inter-basic service set (BSS) devices and intra-BSS devices. The bitmap may be used by devices (e.g., HWD 150) to distribute contention among various devices with latency sensitive traffic and/or allow devices (e.g., console 110) of different BSS's to coordinate.

Figure 2:
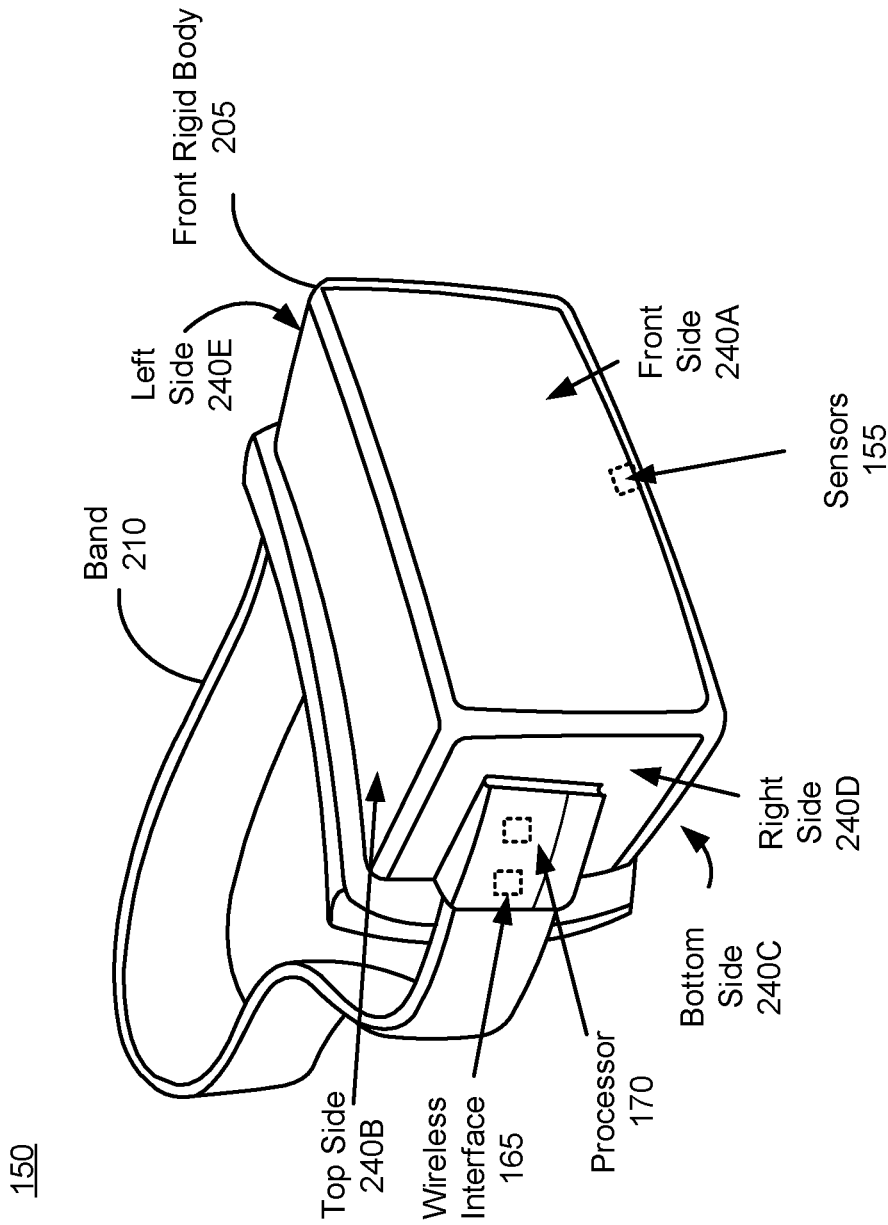
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
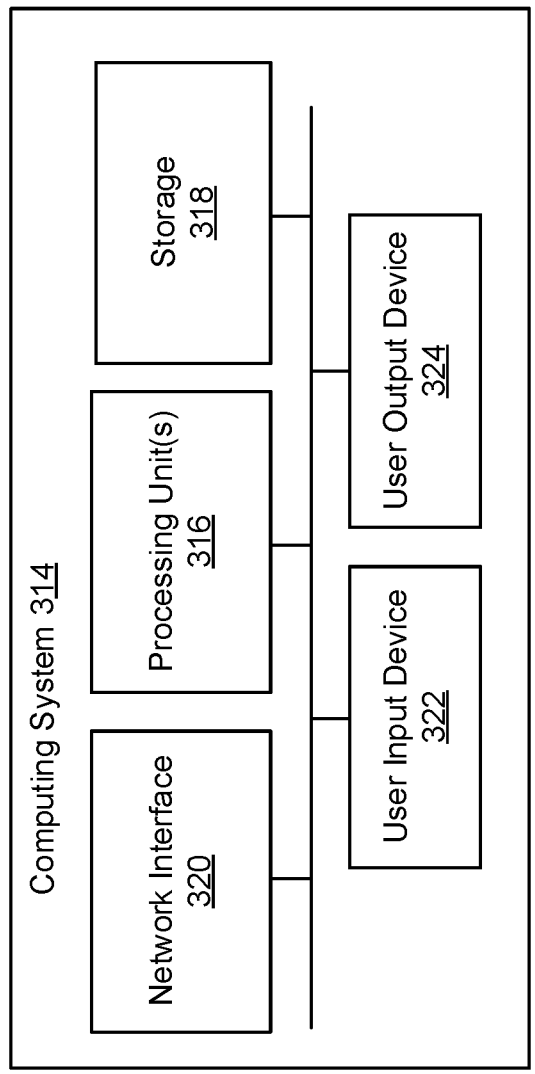
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Figure 4:
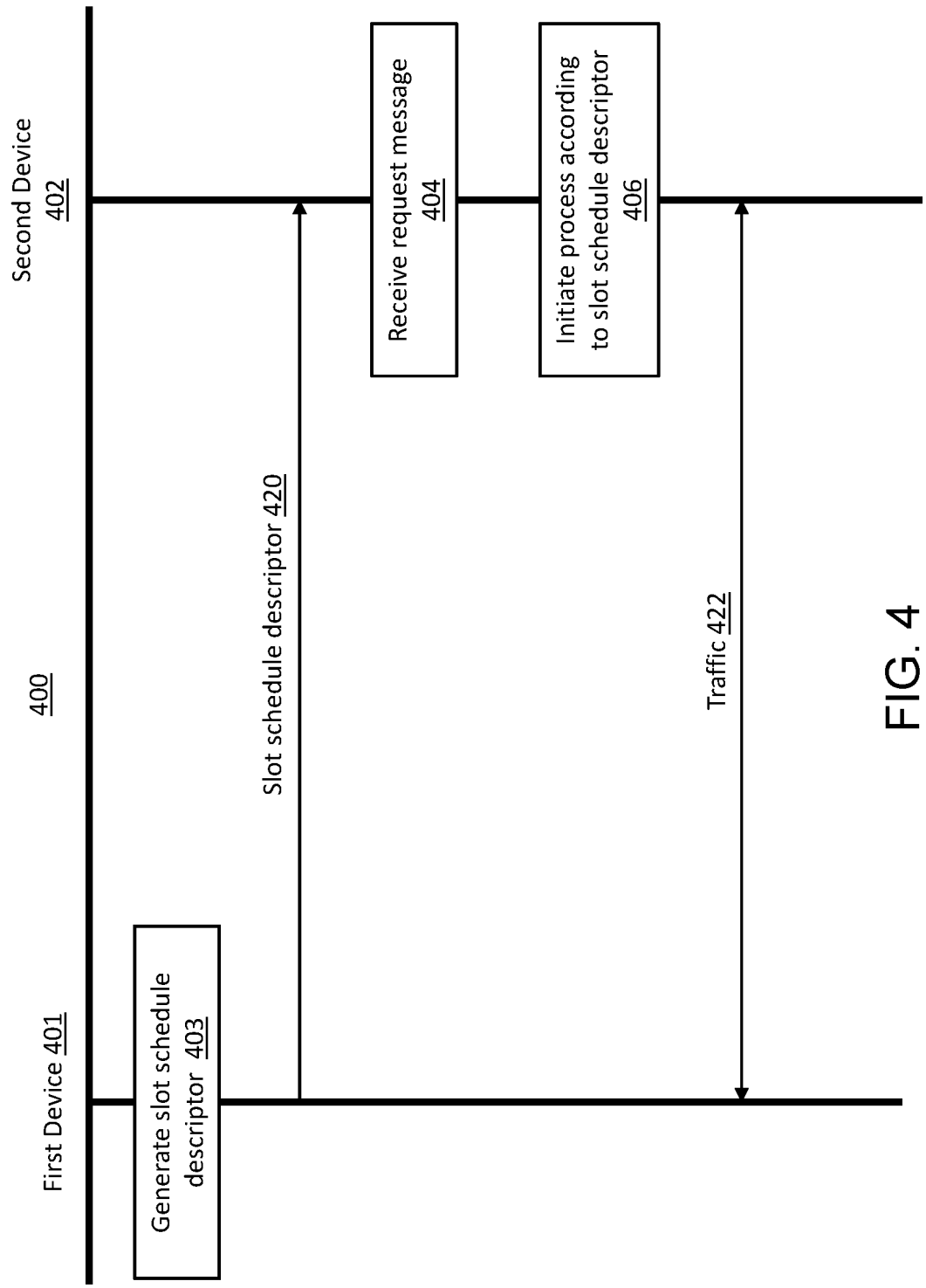
FIG. 4 is an interaction/flow diagram showing a process of communicating slot information between two devices, according to an example implementation of the present disclosure.

FIGS. 1-2 illustrate devices that communicate traffic streams, some of which may be latency sensitive (e.g., those carrying AR/VR information/content). FIG. 4 is an interaction/flow diagram showing a process 400 of communicating slot information between two devices, according to an example implementation of the present disclosure. In some embodiments, the process 400 is performed by a first device 401 and a second device 402. The first device 401 and second device 402 may be some combination of an AP (e.g., console 110, router), a soft AP, and/or a station (e.g., HWD 150). In some embodiments, the process 400 is performed by other entities. In some embodiments, the process 400 includes more, fewer, or different steps than shown in FIG. 4.

In more details of operation 403, the first device 401 may (e.g., include a slot manager configured to) generate a bitmap and associated information, encapsulated in a slot information descriptor or a slot schedule descriptor. The slot schedule descriptor may include values for slots (or durations, frequency resource units, etc.) used to communicate wireless traffic over a link in a wireless local area network (WLAN). Different WLAN protocols that may be executed to implement process 400 can include IEEE 802.11 protocols. In some implementations, devices (e.g., first device 401) may characterize traffic patterns by predicting a traffic pattern (e.g., according to type of application associated with the traffic, usage or operation of a user, and/or historical traffic characteristics). The devices and/or applications may sign up (e.g., request, register) for slots of the LSL according to the predicted traffic pattern, and/or advertised/available slots. The predicted traffic can include the expected traffic originating from the device and/or application, traffic expected by the device and/or application, and/or expected peer-to-peer (P2P) traffic.

The slot schedule descriptor may be used to share scheduling information about the slots and/or the type of traffic being carried over the slots. For example, the first device 401 and the second device 402 may use the generated slot schedule descriptor to agree to a procedure, allocation or assignment (e.g., allocated slots) for transmitting and receiving latency sensitive traffic/traffic streams. The first device 401 may also use the slot schedule descriptor to share the status of the LSL and/or scheduling information (e.g., assigned slots, unassigned slots).

Given latency sensitive traffic, a device may monitor channel contention and/or utilization (e.g., via multicast listener discovery) and can allocate/request one or more links/slots for latency sensitive traffic. In the event the utilization drops below a threshold (e.g., the link is underutilized because there is not enough latency sensitive traffic), an AP for instance, may release one or more STAs from the slot and assign a different traffic stream with latency sensitive traffic and/or use the slot for regular traffic (non-prioritized traffic). Additionally or alternatively, a STA (e.g., that has requested the slot and/or has been allocated the slot) may monitor traffic dynamics of the STA and/or the slot, and can update the reservation.

In some embodiments, the AP may utilize the slot schedule descriptor (e.g., any format and/or packing bits or field values) to update and/or assign traffic to particular slots based on the monitored channel contention/utilization. For example, an AP may monitor the utilization of slots and can modify the assignment of allocated slots. In a different example, depending on the utilization requirements, some slots configured to carry latency sensitive traffic may become available for non-owners and/or non-latency sensitive traffic (non-prioritized traffic or regular traffic) such that bandwidth is not wasted.

Referring to FIG. 5, depicted is an example format of a slot schedule descriptor 500, according to an example implementation of the present disclosure. In some embodiments, the slot schedule descriptor 500 may be communicated from a first device (e.g., an AP, a STA) to a second device (e.g., a STA).

Slot duration 502 may be a duration of time of the slot. The slot duration may be a positive fraction and/or integer number of Time Units (1 TU=1024 microseconds). The slot duration may be predetermined and/or calculated by $2^{(x-1)}$, where x is an integer. In some embodiments, the AP may determine the value of x. The slot duration 502 may be communicated using six bits (or a different amount of bits).

Bitmap length 504 may indicate a number of slots (e.g., a length) indicated in a bitmap (e.g., a status bitmap 512 and/or an information bitmap 514 as discussed further herein). The bitmap length 504 may be indicated by nine bits (or a different amount of bits).

Information bitmap present 506 may be an indicator indicating whether the information bitmap subfield (e.g., information bitmap 514) is present/configured/enabled (and/or contains data). In some embodiments, information bitmap present 506 may be one bit (or a different amount of bits) and set to 1 (or 0) to indicate whether the information bitmap subfield is a subfield in the slot schedule descriptor 500.

Period 508 may indicate the period using a number of slots (or other time units, such as millisecond, Beacon intervals, etc.). For example, when the period indicated in 508 is a positive integer value, the positive integer value may indicate a number of slots per period. When the period indicated in 508 has a value of 0, for instance, the slot schedule descriptor 500 may not be periodic. In other embodiments, the period may be indicated using a number of TUs, Beacon intervals, and the like. Period 508 may be ten bits (or a different amount of bits). In some embodiments, if the bits in period 508 are set to 0 (or 1), then the slot schedule descriptor 500 may be aperiodic.

Persistence 510 may indicate the persistency of certain information/settings. For example, persistence 510 may indicate a number of Beacon intervals (or periods/duration) that (certain or all information in) the slot schedule descriptor 500 persists (e.g., is valid, applicable or unexpired). In a different example, persistence 510 may indicate a number of target beacon transmission times that (certain or all information in) the slot schedule descriptor 500 persists. Persistence 510 may be six bits (or a different amount of bits).

Status bitmap 512 may indicate a status of each slot. The status of each slot may depend on the context of the frame carrying the slot schedule descriptor 500. Accordingly, the type of frame that carries the slot schedule descriptor 500 may adapt the information inside of the slot schedule descriptor 500.

For example, a reporting frame may carry the slot schedule descriptor 500 to announce a slot schedule. Examples of reporting frames that may carry the slot schedule descriptor 500 include beacons and probe responses.

If the slot schedule descriptor 500 is carried in the reporting frame, then the status bitmap 512 may indicate the occupancy of slots. For instance, the bits in the status bitmap 512 may correspond to the occupancy of slots (e.g., whether a different device has been assigned the slot corresponding to the bit in the status bitmap 512). Bits in the status bitmap 512 may be set to 1 (or 0) to indicate the slots are occupied (or unoccupied). If a slot is unoccupied, then a device receiving the slot schedule descriptor 500 may request the unoccupied slot for communication.

A slot request frame may also carry the slot schedule descriptor 500. If the slot schedule descriptor 500 is carried in a slot request frame, then the status bitmap 512 may indicate a number (and/or location) of requested slots. For instance, the bits in the status bitmap 512 may correspond to slots being requested by the device transmitting the request frame. If bits in the status bitmap 512 are set to 1 (or 0), the device transmitting the request frame may be requesting a slot corresponding to the bit in the slot schedule descriptor 500.

A slot response frame may also carry the slot schedule descriptor 500. If the slot schedule descriptor 500 is carried in a slot request frame, then the status bitmap 512 may indicate that the responding device (e.g., an AP) assigns a slot to the receiving device (e.g., a STA) as a result of the preferred slot schedule in the status bitmap 512 transmitted in the slot request frame. For instance, the bits in the status bitmap 512 may correspond to an acknowledgement of the slots being requested from a slot request frame. If bits in the status bitmap 512 are set to 1 (or 0) the device transmitting the request frame may be responding to a request of a slot corresponding to the bit in the slot schedule descriptor 500.

For example, the slot response frame may include bits that mirror/match slots requested in a slot request frame. Additionally or alternatively, the slot response frame may accept the slots requested in a slot request frame by transmitting 1 bit (e.g., a 1 or 0). The slot response frame may also indicate a rejection (or partial rejection) of slots requested in a slot request frame.

Status bitmap 512 may include a variable number of bits. In some implementations, the number of octets (or bits/bytes) of status bitmap 512 may be determined using ceil $$\left(\frac{x}{8}\right)$$

where x is any positive integer. In some implementations, each value of the status bitmap 512 (indicating that a slot in the slot schedule descriptor 500 is occupied, requested by a device, and/or is being assigned by a device) may be one bit.

In other implementations, the slot schedule descriptor 500 may include information bitmap 514. The information bitmap 514 may indicate additional information about the slots. For example, the information bitmap 514 may indicate that a particular slot is full (e.g., the slot is not accepting any new members/devices/traffic). The information bitmap 514 may also indicate that a particular slot is a trigger-only slot (e.g., the slot is being used in a trigger only frame sequence such as frames used in UL orthogonal frequency division multiple access (UL OFDMA)). The information bitmap 514 may also indicate that a particular slot is occupied by overlapping basic service set (OBSS) traffic. In yet other implementations, the information bitmap 514 may indicate that a particular slot is being used for peer-to-peer (P2P) traffic (e.g., devices are communicating traffic or traffic stream(s) using a tethered link).

Information bitmap 514 may include a variable number of bits. In some implementations, the number of octets (or bits/bytes) of status bitmap 512 may be determined using ceil $$\left(\frac{x}{2}\right)$$

where x is any positive integer. In some implementations, each value of the information bitmap 514, (indicating that a slot corresponds to full or not accepting wireless traffic from a new device, is for a trigger-only frame sequence, is occupied by OBSS traffic, and/or is assigned to P2P traffic), may be four bits for instance.

Referring back to FIG. 4, in more detail of operation 420, the first device 401 may transmit a message to the second device 402. Frames that may carry the message (including the slot schedule descriptor 500) can include beacons, probe responses, reporting frames, frames advertising slot configurations, or other frames.

In some embodiments, an information element (IE) may be configured to contain a slot information bitmap, indicating a slot schedule, a status of the slots (e.g., occupied, unoccupied, or other information indicated in the status bitmap 512), and/or additional information (e.g., P2P traffic, or other information indicated by the information bitmap 514). The IE may be configured/defined with header information such as element ID information (which may be one byte or other number of bytes/bits long), IE length (which may be one byte or other number of bytes/bits long), and/or Element ID Extension (which may be one byte or other number of bytes/bits long). The IE may also include the slot schedule descriptor 500, as described herein. The slot schedule descriptor 500 may be a variable number of bytes (or other amount of bits long). The IE may be represented for example, by:

|Element ID (1 byte)|Length (1 byte)|Element ID Extension (1 byte)|Slot information bitmap bitmap (variable)|

Other frames that may carry the message can include any type of handshake action frame. For instance, any handshake action frames in the negotiation process (such as process 400) may carry the message (including the slot schedule descriptor 500). For example, slot request frames and/or slot response frames may carry the message.

In some implementations, if the message (including the slot schedule descriptor 500) is transmitted using a slot request frame, other fields in the slot request frame may include a slot information field. The slot information field may have subfields such as a slot duration, which may be the same as the duration (e.g., in TUs, symbols, slots) as the slot schedule descriptor 500. Additionally or alternatively, there may be a period field indicating the period (as a number of slots, TUs, symbols, etc.). The slot request field may also include a status bitmap (e.g., similar/identical to status bitmap 512 as discussed herein), and an information bitmap (e.g., similar/identical to information bitmap 514 as discussed herein).

In some implementations, the slot request frame may also include a slot control field. The slot control field may include subfields such as a request type subfield. In an example, the slot request frame may indicate, using the request type subfield of the slot control field, whether the device transmitting the slot request frame, is requesting to replace (or change) an existing schedule of slots, create a new schedule, and/or add requested slots. Changing an existing schedule of slots may include deleting an existing schedule and replacing the existing schedule with a new schedule. Adding requested slots to a schedule may include adding slots to a schedule, and creating a new schedule may include creating a schedule of slots.

The slot control field may also include a flexible slot offset indicator. In some embodiments, the flexible slot offset indicator indicates that the requested slot position is flexible. For example, a requesting device (e.g., a STA) may request, in every 32 slots, that slots 4-7 be assigned to latency sensitive traffic. If the flexible slot offset indicator is set to '1', for instance, the requesting device may accept a slot assignment from the AP of any four consecutive slots. If the flexible slot offset indicator is set to '0', for instance, then the requesting device may be requesting the AP to assign four consecutive slots from the slot offset specified in the request. The slot control field may also include an exclusive indicator. The exclusive indicator may indicate whether slots are shared (e.g., between AP and other STAs) and/or whether slots are exclusive.

The slot control field may also include a minimum number of resource units, for instance, if OFDMA is employed, and/or a minimum number of spatial streams (NSS), for instance, if multi-user multiple input, multiple output (MU-MIMO) communication is employed. The slot control field may also indicate a minimum number of slots requested.

Additionally or alternatively, frames such as target wake time (TWT) setup frames may carry the message. The TWT is a time agreed/negotiated upon by devices (e.g., an AP and STA), or specified/configured by one device (e.g., an AP). During the wake time, a first device (e.g., a STA) may be in an awake state (e.g., its wireless communication module/interface is in a fully powered-up ready, or wake state) and is able to transmit and/or receive. When the first device is not awake (e.g., its wireless communication module/interface is in a powered-down, low power, or sleep state), the first device may enter a low power model or other sleep mode. The first device may exist in the sleep state until a time instance/window as specified by the TWT. In some embodiments, frames used in requesting the TWT schedule and/or requesting to access slots during the awake time may be configured to include the slot schedule descriptor 500.

Other frames that may carry the message include slot termination frames and/or fields. Further, frames defined to conduct inter-BSS access coordination may be configured/modified/established/repurposed/appended to include the slot schedule descriptor 500. The bitmap may be transmitted (e.g., by an AP) for both intra-BSS coordination and inter-BSS coordination. In an example, APs of different BSS operating on the same or different links may coordinate/advertise the slot assignment of the allocated link to distribute and/or mitigate medium contention. APs may also advertise slot information to one or more STAs such that the STAs may negotiate or request access to certain slots.

In more details of operation 404, the second device 402 may receive the request message transmitted by the first device 401. The second device 402 may extract information from the request message such as the slot schedule descriptor 500.

In more details of operation 406, the second device 402 may initiate a process according to the bitmap (e.g., the slot schedule descriptor 500) received in operation 420. For example, the second device 402 may request available slots for latency sensitive traffic based on the slots indicated as available in the slot schedule descriptor 500. In a different example, the second device 402 may prepare to communicate traffic streams identified in a response message as latency sensitive traffic streams (e.g., approved/accepted by the first device 401 in a slot request message, for instance). The second device 402 may communicate these traffic streams as prioritized traffic streams on prioritized time slots instead of regular traffic streams on regular time slots.

In more details of operation 422, the second device 402 may transmit traffic based on the process performed in operation 406. For example, if the second device 402 generated a slot request frame based on the slot schedule descriptor 500, the second device 402 may transmit the slot request frame. Alternatively, the second device 402 may transmit traffic streams based on the slots assigned to the second device 402 in the slot schedule descriptor 500. As shown, the traffic transmitted may be bi-directional.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a first wireless communication device, a bitmap having a value for each of a plurality of slots for wireless traffic, to indicate a status or type of a corresponding slot, wherein a first bit of the bitmap set to 1 indicates that a slot corresponding to the first bit has a status or type that is different from a status or type of a second slot corresponding to a second bit of the bitmap that is set to 0; and
   sending, by the first wireless communication device to a second wireless communication device using a wireless local area network (WLAN) based protocol, a message comprising the bitmap,
   wherein the message further comprises a duration of each of the plurality of slots, a period of the plurality of slots, and a persistency of the plurality of slots, and
   wherein the status or type of the corresponding slot indicates that the corresponding slot is at least one of: full or not accepting wireless traffic from a new device, for trigger-only frame sequence, occupied by overlap basic service set (OBSS) traffic, or assigned to peer-to-peer (P2P) traffic.

2. The method of claim 1, wherein the status or type of the corresponding slot indicates that the corresponding slot is occupied, is being requested by the first wireless communication device, or is being assigned by the first wireless communication device.

3. The method of claim 2, wherein the value for each of the plurality of slots is carried in 1 bit.

4. The method of claim 1, wherein the value for each of the plurality of slots is carried in 4 bits.

5. The method of claim 1, wherein:
   when the period has a positive integer value, the positive integer value indicates a number of slots as the period, and
   when the period has a value of 0, the plurality of slots is non-periodic.

6. The method of claim 1, wherein the persistency indicates a duration over which information in the message is valid.

7. The method of claim 1, wherein the message further comprises at least one of: an indication of a length of the bitmap, or an indication of whether the bitmap is present in the message.

8. The method of claim 1, wherein the message comprises a beacon frame, a probe response, a reporting frame, a frame for advertising slot configuration, a slot request frame, a slot response frame, a frame for slot termination, or a frame to conduct inter basic service set (inter-BSS) access coordination.

9. The method of claim 1, wherein the message is a slot request frame, the message further comprising at least one of: a request type, a flexible slot offset indicator, an indicator of slot exclusivity or sharing, a minimum number of slots requested, a minimum resource unit (RU) to be used, or a minimum number of spatial streams (NSS) to be used.

10. The method of claim 1, comprising:
    monitoring, by the first wireless communication device, a utilization of the plurality of slots; and
    determining, by the first wireless communication device, the bitmap to update an assignment of at least one of the plurality of slots.

11. A first wireless communication device comprising:
    at least one processor configured to determine a bitmap having a value for each of a plurality of slots for wireless traffic, to indicate a status or type of a corresponding slot, wherein a first bit of the bitmap set to 1 indicates that a slot corresponding to the first bit has a status or type that is different from a status or type of a second slot corresponding to a second bit of the bitmap that is set to 0; and
    a transceiver configured to send, to a second wireless communication device using a wireless local area network (WLAN) based protocol, a message comprising the bitmap,
    wherein the message further comprises a duration of each of the plurality of slots, a period of the plurality of slots, and a persistency of the plurality of slots, and
    wherein the status or type of the corresponding slot indicates that the corresponding slot is at least one of: full or not accepting wireless traffic from a new device, for trigger-only frame sequence, occupied by overlap basic service set (OBSS) traffic, or assigned to peer-to-peer (P2P) traffic.

12. The first wireless communication device of claim 11, wherein the status or type of the corresponding slot indicates that the corresponding slot is occupied, is being requested by the first wireless communication device, or is being assigned by the first wireless communication device.

13. The first wireless communication device of claim 12, wherein the value for each of the plurality of slots is carried in 1 bit.

14. The first wireless communication device of claim 11, wherein the value for each of the plurality of slots is carried in 4 bits.

15. The first wireless communication device of claim 11, wherein:
    when the period has a positive integer value, the positive integer value indicates a number of slots as the period, and
    when the period has a value of 0, the plurality of slots is non-periodic.

16. The first wireless communication device of claim 11, wherein the persistency indicates a duration over which information in the message is valid.

17. The first wireless communication device of claim 11, wherein the message further comprises at least one of: an indication of a length of the bitmap, or an indication of whether the bitmap is present in the message.

18. The first wireless communication device of claim 11, wherein the message comprises a beacon frame, a probe response, a reporting frame, a frame for advertising slot configuration, a slot request frame, a slot response frame, a frame for slot termination, or a frame to conduct inter basic service set (inter-BSS) access coordination.

* * * * *